United States Patent Office 3,083,181
Patented Mar. 26, 1963

3,083,181
AMINOARYL TETRAHYDROQUINOLINES
James O. Harris, St. Albans, W. Va., assignor to Monsanto Chemical Company, St. Louis, Mo., a corporation of Delaware
No Drawing. Filed Oct. 3, 1960, Ser. No. 59,809
13 Claims. (Cl. 260—45.8)

This invention relates to tetrahydroquinolines containing an aromatic amino substituent in the heterocyclic ring. The new compounds result from addition of aromatic compounds across the double bond of 6-substituent 1,2-dihydroquinolines. It would be expected that the aryl group would enter the 4-position and this is assumed to be the case although it has not been established with certainty. Suitable reactants include substances which are themselves polymerizable so that combination in more than one ratio is possible. The new compounds may be represented by the general formula

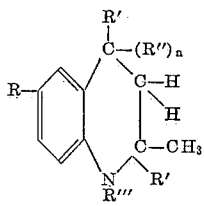

where R is alkyl, phenyl, cyclohexyl, alkoxy or phenoxy and R' is a lower alkyl group such as methyl, ethyl, propyl, isopropyl, butyl and amyl. R'' is an aminosubstituted aryl radical, R''' is hydrogen or a nitroso radical and $n$ is an integer usually one. The invention particularly relates to copolymers of 6-ether substituted 1,2-dihydroquinolines and dihydro or tetrahydroquinolines. Copolymers of 6-ether substituted 1,2-dihydroquinolines and 1,2,3,4-tetrahydroquinolines may be represented by the general formula

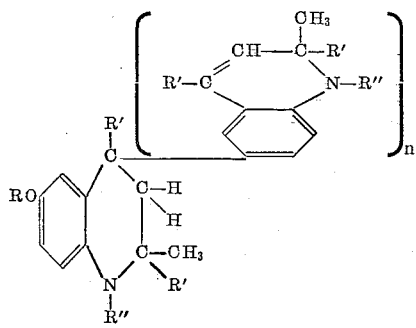

where R and R' are the same or different lower alkyl groups, R'' is hydrogen or a nitroso radical and $n$ is a small integer greater than zero. Ordinarily $n$ will not exceed 4.

The new compounds are valuable for the preservation of oxidizable substances which deteriorate by absorption of oxygen and ozone from the atmosphere. Such substances comprise gasoline, vegetable oils, mineral oils and rubber. The products are especially valuable for the preservation of unvulcanized or vulcanized natural or synthetic rubber. They combine antioxidant and antiozonant activity. The alkoxydihydroquinolines per se are useful in this regard but the new compounds are more resistant to loss through volatilization from the rubber. The hydrogen on the amino group in the quinoline rings is reactive and the new compounds also serve as intermediates for the preparation of more complex molecules by acylation, nitrosation and other reactions typical of secondary amines. The nitroso derivatives prepared by reaction of the products with sodium nitrite are also valuable antidegradants.

The preferred compounds may be prepared by condensing 6-alkoxy, 1,2-dihydroquinolines with aniline or substituted aniline in the presence of mineral acid. The position para to the amino group must be open in order for the reaction to take place. Suitable reactants comprise aniline, N-methylaniline, N,N-dimethylaniline, N-cyclohexylaniline, diphenylamine, triphenylamine, N,N-diamylaniline, 1,2-dihydro-2,2,4-trimethylquinoline and 1,2,3,4-tetrahydro-2,2,4-trimethylquinoline. The dihydroquinolines enter into a self-condensation reaction in the presence of mineral acid. Interestingly, neither 6-alkoxy dihydroquinolines nor 1,2,3,4-tetrahydroquinolines undergo self-condensation in the presence of mineral acid although the copolymer forms readily. There may be substituted for 6-alkoxy 1,2-dihydroquinoline, 6-dodecyl-1,2-dihydro-2,2,4-trimethylquinoline, 6-phenyl-1,2-dihydro-2,2,4-trimethylquinoline, 6-phenoxy-1,2-dihydro-2,2,4-trimethylquinoline, 6-butyl-1,2-dihydro-2,2,4-trimethylquinoline or 6-cyclohexyl-1,2-dihydro-2,2,4-trimethylquinoline.

As illustrative of the preparation of the products of this invention, substantially 108.5 grams (0.5 mole) of 6-ethoxy-1,2-dihydro-2,2,4-trimethylquinoline and substantially 89.5 grams (0.5 mole) of 1,2,3,4-tetrahydro-2,2,4-trimethylquinoline were mixed in a suitable reactor in the presence of substantially 90 grams of concentrated hydrochloric acid in 200 ml. of water. The mixture was refluxed at 101° C. for a period of 13 hours and then washed with a 25% sodium hydroxide solution. The product was next dissolved in benzene and washed with water. The benzene was removed by distillation and the residue vacuum distilled. 4-[6-(1,2,3,4-tetrahydro-2,2,4-trimethylquinolyl)] - 6 - ethoxy - 1,2,3,4 - tetrahydro - 2,2,4 - trimethylquinoline was obtained as a pale yellow solid melting at 50–52° C.

To prepare the nitroso derivative, 39.2 grams of the above copolymer was suspended in 150 ml. of ethanol, the mixture cooled to 0° C. and 24 ml. of concentrated hydrochloric acid then added. The mixture was again cooled to 0° C. and while stirring, 16 grams of sodium nitrite dissolved in 30 ml. of water was slowly added, maintaining the temperature at 0–5° C. during the addition. The product was then filtered and the filter cake recrystallized from a methanol-water solution to yield 4[6 - (1,2,3,4 - tetrahydro - 2,2,4 - trimethyl - 1 - nitrosoquinolyl)] - 6 - ethoxy - 1,2,3,4 tetrahydro - 2,2,4 - trimethyl-1-nitrosoquinoline as an orange solid, M.P. 69–72° C. with decomposition.

In another example of the invention a 500 ml. flask equipped with stirrer and thermometer was charged with 69.2 grams of freshly distilled 2,2,4-trimethyl-1,2-dihydroquinoline, 45.4 grams of freshly distilled 6-ethoxy-1,2-dihydro-2,2,4-trimethylquinoline, 54.5 grams of 36.1% hydrochloric acid and 44 grams of water. The charge was heated for 6 hours at 95–96° C. The reaction mixture was then diluted with dilute hydrochloric acid, cooled and poured into sodium hydroxide solution. The precipitate, a sticky semi-solid white product, was dissolved in benzene, washed with a little water and the benzene removed by distillation. The residue was then heated in vacuo to remove unreacted constituents. From a still charge of 102.5 grams there was distilled 41.0 grams of unreacted material. The distillate was analyzed and found to contain 72% 6-ethoxy-1,2-dihydro-2,2,4-trimethylquinoline and 28% 1,2-dihydro-2,2,4-trimethylquinoline. From these data it was ascertained that 11.1 grams of 6-ethoxy-1,2-dihydro-2,2,4-trimethylquinoline and 50.5 grams of 1,2-dihydro-2,2,4-trimethylquinoline had reacted. This is not necessarily the combined ratio because some polymerized 1,2-dihydro-2,2,4-trimethylquinoline is undoubtedly present. For most purposes separation of this constituent is unnecessary. The product without further purification is an efficient antiozidant for rubber.

A solution of 6-ethoxy-1,2-dihydro-2,2,4-trimethylquinoline in hydrochloric acid was prepared by adding 108.5 grams (0.5 mole) of the aforesaid quinoline to 0.35 mole of hydrochloric acid (35 grams conc. hydrochloric acid) and 200 grams of water at 101° C. A second solution was prepared by adding 86.5 grams of 1,2-dihydro-2,2,4-trimethylquinoline (0.5 mole) to 0.55 mole of hydrochloric acid (55 grams conc. hydrochloric acid) and 300 ml. water. This second solution was added gradually to the first at a temperature of 75–80° C. over a period of 3½ hours. Heating was continued at refluxing temperature for 2½ hours after addition was complete. The charge was then neutralized with dilute sodium hydroxide which resulted in separation of a gummy substance. The mixture was stirred with heptane containing a little benzene and the organic layer washed with water and the solvent removed by evaporation. The residue was subjected to distillation in vacuo. The unreacted constituents were removed at pot temperatures of 165–174° C., vapor temperatures 112–134° C. 1–2 mm. Hg. The residue was then heated to 350° C. and 41 grams of product collected at vapor temperature of 200–220° C. at 1 mm. pressure. Analysis for ethoxy group gave 9.0% ethoxy substituent. The calculated values for 1/1, 1/2 and 1/3 copolymers are 11.5%, 8% and 6.1% respectively. Thus, the major proportion of the copolymer is combined in a 1/1 ratio. Results indicate about 71.5% 1/2 copolymer and 28.5% 1/1 copolymer.

A glass reactor was charged with 45 grams of conc. hydrochloric acid (0.46 mole HCl), 100 ml. of water, 54.3 grams (0.250 mole) of freshly distilled 6-ethoxy-1,2-dihydro-2,2,4-trimethylquinoline and 23.3 grams (0.250 mole) of aniline. The mixture was heated to refluxing temperature and stirred at refluxing temperature (105–110° C.) for about 75 hours. The reaction mixture was then cooled and made slightly basic with 25% sodium hydroxide solution. Benzene (300 ml.) was added, the mixture stirred for one-half hour, the layer separated and the benzene solution washed with water until the washings were neutral. The benzene and unreacted constituents were removed by distillation in vacuo. There was recovered 11 grams (0.118 mole) of aniline and 34.0 grams (0.157 mole) of 6-ethoxy-1,2-dihydro-2,2,4-trimethylquinoline. Assuming a 1/1 adduct the product obtained as a residue represented 40% yield.

To 45.0 grams of concentrated hydrochloric acid and 100 ml. of water was added 54.3 grams (0.250 mole) of freshly distilled 6-ethoxy-1,2-dihydro-2,2,4-trimethylquinoline and 26.8 grams (0.250 mole) of N-methylaniline. The mixture was stirred and heated at refluxing temperature for 75 hours. The reaction mixture was then cooled in an ice bath, made slightly basic with 25% sodium hydroxide solution and 300 ml. of benzene added. The reaction mixture was stirred with the benzene for about ½ hour, allowed to stand and the benzene layer separated. The benzene solution was then washed with water until the water phase was neutral. The benzene and unreacted constituents were removed by distillation in vacuo, 9 grams of N-methylaniline and 17 grams of 6-ethoxy-1,2-dihydro-2,2,4-trimethylquinoline being recovered. The residue of 45 grams represented a 55% yield of 4-(4-methylaminophenyl)-6-ethoxy-1,2,3,4-trimethylquinoline. The molecular weight was 358 as compared to a calculated value of 324.5.

Replacing N-methylaniline with 0.250 mole of dimethylaniline gave a 47% yield of 4-(4-dimethylaminophenyl)-6-ethoxy - 1,2,3,4 - tetrahydro - 2,2,4 - trimethylquinoline. Molecular weight was 386 as compared to a calculated value of 338.5.

Replacement of N-methylaniline with 0.250 mole of o-toluidine gave a 53% yield of 4-(4-amino-3-methylphenyl)-6-ethoxy - 1,2,3,4 - tetrahydro - 2,2,4 - trimethylquinoline. Molecular weight was 376 as compared to a calculated value of 324.5.

As illustrative of resistance to oxidation of stocks containing the new copolymers rubber stocks were compounded comprising:

| Stock | A | B |
|---|---|---|
| | Parts by weight | |
| Smoked sheets | 100 | 100 |
| Carbon black | 50 | 50 |
| Zinc oxide | 5 | 5 |
| Stearic acid | 3 | 3 |
| Sulfur | 3 | 3 |
| Pine tar | 2 | 2 |
| N-Cyclohexyl 2-benzothiazolesulfenamide | 0.8 | 0.8 |
| 4-[6-(1,2,3,4-Tetrahydro-2,2,4-trimethyl-quinolyl)]-6-ethoxy-1,2,3,4-tetrahydro-2,2,4-trimethylquinoline | | 1.0 |

The stocks were cured by heating 45 minutes at 144° C., then aged under various conditions and the proportion of the original tensile strength retained after aging observed. The results are recorded in Table I.

Table I

| Stock | Percent Retention of Ultimate Tensile Strength | |
|---|---|---|
| | Air Oven Aging— 48 Hours at 100° C. | Oxygen Bomb Aging—3 days/ 70° C. under 300# Oxygen/ in.² |
| A (control) | 27 | 12 |
| B | 51 | 66 |

These data demonstrate that the new compounds prevent deterioration by air or oxygen.

Stress relaxation measurements afforded another important demonstration of antidegradant properties. A weight was affixed to one end of a cured strip of rubber, the other end of which was maintained in fixed position. Gradual relaxation of stress was followed by periodically measuring the elongation. The time for elongation to increase 100% was recorded. This test, commonly referred to as creep test, furnishes a reliable indication of fugitiveness of an antidegradant. The applied load was 60 pounds per square inch.

Table II

Creep-hours to 100% increase
Stock: in elongation
A (control) _____ 50
B _____ 196

To demonstrate anti-exposure cracking properties, tests were conducted in rubber stocks comprising:

| Stock | C | D | E | F | G | H |
|---|---|---|---|---|---|---|
| | Parts by weight ||||||
| Smoked sheets | 100 | 100 | 100 | | | |
| SBR 1500 rubber | | | | 100 | 100 | 100 |
| Carbon black | 50 | 50 | 50 | 50 | 50 | 50 |
| Zinc oxide | 5 | 5 | 5 | 4 | 4 | 4 |
| Stearic acid | 3 | 3 | 3 | 2 | 2 | 2 |
| Saturated hydrocarbon softener | 3 | 3 | 3 | 10 | 10 | 10 |
| Sulfur | 2.5 | 2.5 | 2.5 | 1.75 | 1.75 | 1.75 |
| N-Cyclohexyl 2-benzothiazole-sulfenamide | 0.5 | 0.5 | 0.5 | 1.2 | 1.2 | 1.2 |
| 4-[6-(1,2,3,4-Tetrahydro-2,2,4-trimethylquinolyl)]-6-ethoxy-1,2,3,4-tetrahydro-2,2,4-trimethylquinoline | | 1.5 | | | 1.5 | |
| 4-[6-(1,2,3,4-Tetrahydro-2,2,4-trimethyl-1-nitrosoquinolyl)]-6-ethoxy-1,2,3,4-tetrahydro-2,2,4-trimethyl-1-nitrosoquinoline | | | 1.5 | | | 1.5 |

SBR 1500 is styrene-butadiene copolymer rubber, the bound styrene content of which is 23.5%. Antioxidant is added but this has no significant effect in preventing exposure cracking. Stocks C, D and E were cured by heating in a press 30 minutes at 144° C. and stocks F, G and H by heating in a press 60 minutes at 144° C. Since evaluation under static conditions is not indicative of the service obtained with many types of rubber articles which must withstand flexing, the vulcanized compositions were evaluated under dynamic conditions in an atmosphere containing a definite concentration of ozone. The test was carried out in the following manner: Samples of the stocks were cured in the form of a belt ½ inch wide, ¼ inch thick and 5 3/16 inches inside diameter and mounted on 1 inch diameter shafts. The ozone concentration was maintained at 20–30 parts per hundred million throughout the test and the shafts rotated at 75 r.p.m. In this manner a momentary elongation through a range of 0–20% was provided at any portion of the test specimens passing over the shaft. Further details of the apparatus and procedure employed were described by Creed et al. in Analytical Chemistry, vol. 25, page 241, February 1953. The test specimens were compared visually to previously selected standards at regular intervals, noting the extent of cracking. The standards represented different degrees of cracking on a numerical scale of 1–6 on which 1 represented no cracking and 6 extermely severe cracking. Severity of cracking was assigned numerical rating in this manner. By plotting the severity of cracking on the Y axis in inverse order versus time of exposure on the X axis, curves were obtained which related severity of cracking and time. Comparative results were obtained by determining and comparing the areas under the curves. The results were expressed on the basis of the blank or unprotected stock as 100. Thus a value of 200 means that the area under the above-described curve was twice that of the unprotected stock.

Table III

Stock: Protection rating against ozone
C (control) ---------- 100
D ---------- 185
E ---------- 150
F (control) ---------- 100
G ---------- 191
H ---------- 175

The resistance of the compounds to prevulcanization was evaluated by means of an NBS model Mooney viscometer following A.S.T.M. D1077-49T with the exception that the scorch point was taken at 10 units higher than the minimum instead of 5 units. Stocks C and E were run at 121° C. and stocks F and H at 135° C.

Table IV

Stock: Scorch time in minutes
C (control) ---------- 15
D ---------- 27
F (control) ---------- 25
H ---------- 34

Stocks vulcanized with thioamine vulcanizing agents tend to be deficient in flexing properties but addition of the compounds of this invention overcomes this shortcoming. As illustrative of vulcanization in the presence of an organic sulfide vulcanizing agent, stocks were prepared as follows:

| Stock | J | K |
|---|---|---|
| | Parts by weight ||
| Smoked sheets | 100 | 100 |
| Carbon black | 50 | 50 |
| Zinc oxide | 5 | 5 |
| Stearic acid | 3 | 3 |
| Saturated hydrocarbon softener | 3 | 3 |
| Sulfur | 1 | 1 |
| N,N'-Dithiobis morpholine | 1 | 1 |
| Lead oxide | | 0.01 |
| 4-[6-(1,2,3,4-Tetrahydro-2,2,4-trimethyl-1-nitrosoquinolyl)]-6-ethoxy-1,2,3,4-tetrahydro-2,2,4-trimethyl-1-nitrosoquinoline | | 1.5 |

The stocks were cured in the usual manner in a press for 45 minutes at 144° C. and the flex cracking resistance of the vulcanized products determined on an India flexing machine (Torrance and Peterson, India Rubber World, 80, 62 [1929]). In the center of a standard India flexing specimen an 0.2 inch slit was cut and the specimen flexed on the machine at 212° F. until the slit had progressed all the way across the specimen. The number of kilocycles before failure was recorded. The results of the tests are set forth below:

Table V

Stock: Cut growth (kilocycles to failure)
J (control) ---------- 350
K ---------- 675

The deficiency in flexing properties of the stock vulcanized with an N-thioamine has been overcome by addition of one of the compounds of this invention. Additionally, the scorch time of stock J at 121° C. was 35 minutes whereas that for stock K was increased to 53 minutes.

Although the invention has been illustrated by numerous specific embodiments, it is not limited thereto. The copolymers may be used for the protection of other types of sulfurvulcanizable rubbers. These rubbers comprise natural rubber in its various forms, as for example latex, crepe, smoked sheets, gutta-percha, balata and cyclo rubbers. They are applicable generally for protection of natural and synthetic elastomers which deteriorate by absorbing oxygen and ozone from the atmosphere, as for example polybutadiene, polyisoprene and polyisobutylene polymerized with a small proportion of a diolefin.

The amounts used in the rubber will vary depending upon the particular stock and the purpose of the compounder. In general, amounts within the range of 0.1–5.0 parts encompass the range normally used.

It is intended to cover all changes and modifications of the examples of the invention herein chosen for purposes of disclosure which do not constitute departures from the spirit and scope of the invention.

What is claimed is:
1. A compound of the structure

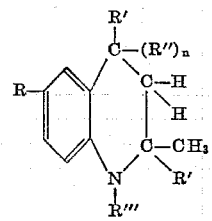

where R is selected from the group consisting of alkyl, alkoxy, phenyl, phenoxy and cyclohexyl, R' is a lower alkyl radical, R" is selected from a group consisting of 6 - (1,2,3,4 - tetrahydro - 2,2,4 - trimethylquinolyl), 6-(1,2-dihydro-2,2,4-trimethylquinolyl) and

where $x$ and $y$ are selected from a group consisting of hydrogen, alkyl, cyclohexyl, and phenyl, R''' is selected from a group consisting of hydrogen and nitroso radicals and $n$ is an integer greater than zero but less than five.

2. A compound of the structure

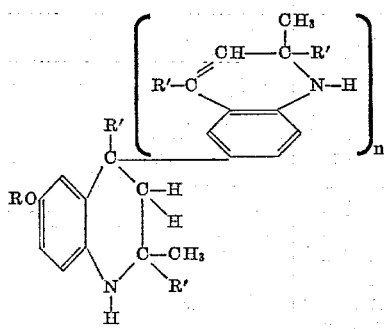

where R and R' are lower alkyl radicals and $n$ is an integer greater than zero but less than five.

3. 4 - [6 - (1,2,3,4 - tetrahydro - 2,2,4 - trimethylquinolyl)] - 6 - ethoxy - 1,2,3,4 - tetrahydro - 2,2,4 - trimethylquinoline.

4. 4 - [6 - (1,2,3,4 - tetrahydro - 2,2,4 - trimethyl - 1-nitrosoquinolyl)] - 6 - ethoxy - 1,2,3,4 - tetrahydro - 2,2,4 - trimethyl-1-nitrosoquinoline.

5. Rubber in which there is incorporated a small amount, sufficient to inhibit degradation, of an antidegradant of the structure

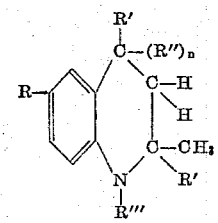

where R is selected from the group consisting of alkyl, alkoxy, phenyl, phenoxy and cyclohexyl, R' is a lower alkyl radical, R" is selected from a group consisting of 6 - (1,2,3,4 - tetrahydro - 2,2,4 - trimethylquinolyl), 6-(1,2-dihydro-2,2,4-trimethylquinolyl) and

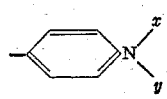

where $x$ and $y$ are selected from a group consisting of hydrogen, alkyl, cyclohexyl, and phenyl, R''' is selected from a group consisting of hydrogen and nitroso radicals and $n$ is an integer greater than zero but less than five.

6. Rubber in which there is incorporated a small amount, sufficient to inhibit degradation, of a compound of the structure

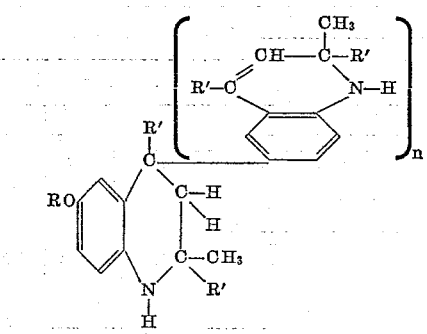

where R and R' are lower alkyl radicals and $n$ is an integer greater than zero but less than five.

7. Rubber in which there is incorporated a small amount, sufficient to inhibit degradation, of 4-[6-(1,2,3,4-tetrahydro - 2,2,4 - trimethylquinolyl)] - 6 - ethoxy - 1,2,-3,4-tetrahydro-2,2,4-trimethylquinoline.

8. Vulcanized rubber having incorporated therein a small amount, sufficient to inhibit degradation, of an antidegradant of the structure

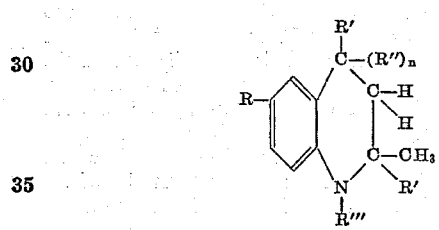

where R is selected from the group consisting of alkyl, alkoxy, phenyl, phenoxy and cyclohexyl, R' is a lower alkyl radical, R" is selected from a group consisting of 6 - (1,2,3,4 - tetrahydro - 2,2,4 - trimethylquinolyl), 6-(1,2-dihydro-2,2,4-trimethylquinolyl) and

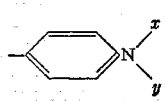

where $x$ and $y$ are selected from a group consisting of hydrogen, alkyl, cyclohexyl, and phenyl, R''' is selected from a group consisting of hydrogen and nitroso radicals and $n$ is an integer greater than zero but less than five.

9. Vulcanized rubber having incorporated therein a small amount, sufficient to inhibit degradation, of a compound of the structure

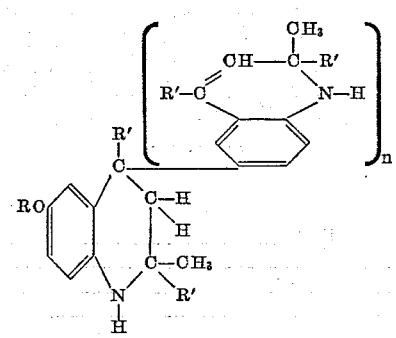

where R and R' are lower alkyl radicals and $n$ is an integer greater than zero but less than five.

10. Vulcanized rubber having incorporated therein a small amount, sufficient to inhibit degradation, of 4-[6-(1,2,3,4 - tetrahydro - 2,2,4 - trimethylquinolyl)] - 6-ethoxy-1,2,3,4-tetrahydro-2,2,4-trimethylquinoline.

11. The process which comprises copolymerizing by means of mineral acid a compound of the structure

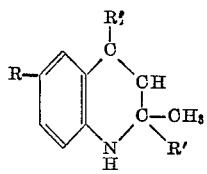

where R is selected from the group consisting of alkyl, alkoxy, phenyl, phenoxy and cyclohexyl and R′ is a lower alkyl radical with a member selected from the group consisting of 1,2,3,4-tetrahydro-2,2,4-trimethylquinoline, 1,2-dihydro-2,2,4-trimethylquinoline, and

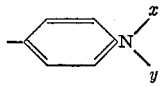

where $x$ and $y$ are selected from a group consisting of hydrogen, alkyl, cyclohexyl and phenyl.

12. The process which comprises copolymerizing with mineral acid a compound of the structure

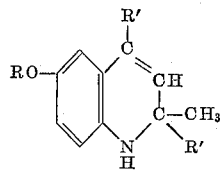

where R and R′ are lower alkyl radicals with 1,2-dihydro-2,2,4-trimethylquinoline.

13. The process which comprises copolymerizing by means of mineral acid 6-ethoxy-2,2,4-trimethyl-1,2-dihydroquinoline with 1,2,3,4-tetrahydro-2,2,6-trimethylquinoline.

References Cited in the file of this patent

UNITED STATES PATENTS

| | | |
|---|---|---|
| 2,500,229 | Arnold et al. | Mar. 14, 1950 |
| 2,811,503 | Hand et al. | Oct. 29, 1957 |
| 2,832,749 | Harris | Apr. 29, 1958 |